Nov. 2, 1971 K. L. THOMPSON 3,616,774
FLOATING DOCK STRUCTURE

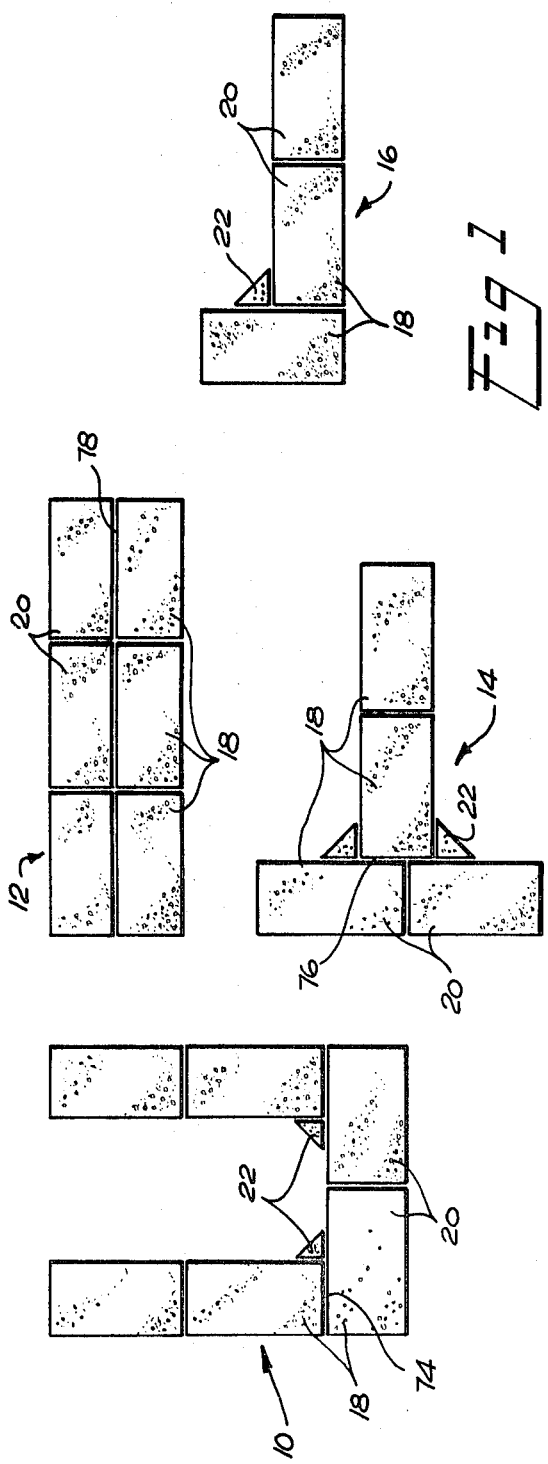

Filed Aug. 15, 1969 2 Sheets-Sheet 2

INVENTOR.
KENNETH L. THOMPSON
BY Nilsson & Robbins
Attorneys

United States Patent Office 3,616,774
Patented Nov. 2, 1971

3,616,774
FLOATING DOCK STRUCTURE
Kenneth L. Thompson, Huntington Beach, Calif.,
assignor to Ye Dock Masters, Inc.
Filed Aug. 15, 1969, Ser. No. 850,608
Int. Cl. B63b 35/00
U.S. Cl. 114—.5
13 Claims

ABSTRACT OF THE DISCLOSURE

A floating dock structure wherein flotation members support longitudinal frame members which, in turn, support decking for the dock. A plurality of flooring members can be secured to the flotation members and the frame members can be metal channels secured to the floor members. Tying members are secured transverse of the structure, between the channels and support longitudinal underpinning members, extending the length of the structure, to which the decking is secured.

FIELD OF THE INVENTION

The field of art to which the invention pertains includes the field of ships, particularly floating docks therefor.

BACKGROUND AND SUMMARY OF THE INVENTION

Boat docks of typical prior art construction are of the stationary type rigidly affixed and set in position using piles, timbers and other materials and methods for which large sums must be expended for construction labor costs. The structures are fixed in place and cannot be disassembled for repair or maintenance, or moved from one location to another. The present invention provides a floating dock of modular construction which can be readily assembled to form any desired dock shape, and which can be readily disassembled to make repairs, to maintain the dock, to change the configuration of the dock, or to move the dock to a different location. The present invention provides a dock with these advantages yet which is of strong and lasting construction and which can provide a permanent dock.

In accordance herewith, channel members, of U-shaped cross-section, are supported on one or more flotation members, spaced to define the width of the dock and supporting non-slip decking. A plurality of flooring members are secured to the flotation members transverse thereof and the channel members are secured to the flooring members to extend upwardly therefrom so as to space the decking from the flotation members. Tying members are secured transverse of the structure to and between the channel members. The tying members are notched along their top edges for receiving in the notches longitudinal underpinnings which serve as torsion bars for the structure and to which the decking is secured.

The flotation member or members and flooring members constitute a modular unit. The tying members are spaced on opposite sides of the modular units and are foraminated for bolted connection thereat, one to the other for interconnection of the modular units. The channel frame members and underpinning members are disposed so that each frame member interconnects at least two modular units and the joins between tandem frame members are spaced longitudinally from the connection between tandem modular units, to thereby give the structure additional strength. The undersinning members may be hollow metal tubes interconnected by a channel member formed to straddle the joined ends thereof.

BRIEF DESCRIPTION OF THE DRAWINGS

FIG. 1 depicts plan views of a number of floating dock configurations which may be constructed in accordance with the principles of this invention;

FIG. 2 is a plan, partially broken view of a modular unit and adjacent connected units;

DETAILED DESCRIPTION

Referring to FIG. 1, there are illustrated a number of floating dock configurations 10, 12, 14 and 16, each composed of a plurality of modular dock units 18, and bearing a non-skid top surface 20. Each module is constructed in a manner as hereinafter detailed and is joined to adjacent modules, tandemly, laterally or otherwise to form any desired configuration. Triangular knee sections 22 can be utilized to join laterally connected modular units 18, as illustrated.

Figure 3:
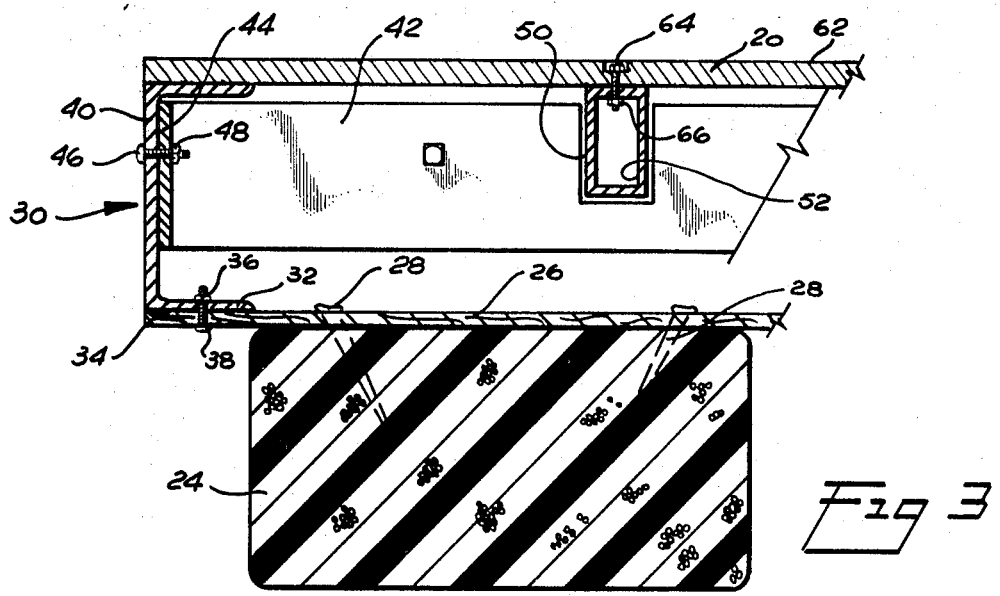
FIG. 3 is a vertical sectional view on the line 3—3 of FIG. 2, in the direction of the arrows.

Referring to FIGS. 2 and 3, there are depicted details of construction of the modular units and the manner in which the dock components are assembled so as to form an integrated permanent structure. Each unit includes at least one flotation member which can be in the form of a plastic foam filled pontoon 24, across which are disposed a plurality of floor members in the form of hardwood boards 26. The floor boards 26 utilized herein are about ¾ inch thick and six inches wide and are secured with cross members 28, which may be stakes, nails, or the like set through the floorboards 26 into the foam filled pontoons 24. Each module 18 is constructed to be approximately four feet wide and eight feet long, but other dimensions may be used.

Elongate aluminum channel members 30 are disposed on opposite longitudinal sides of each modular unit 18, one flange 32 of each channel member being secured to an edge 34 of the floor board 26 which overlaps the pontoon 24, e.g. with nuts 36 and bolts 38 therethrough. Thus, a channel wall 40 is secured upright from the floorboard 26 to constitute frame members for further construction as hereinafter described.

Figure 4A:
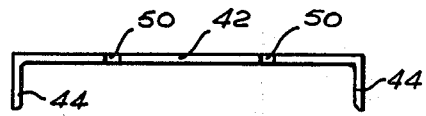
FIGS. 4A and 4B depict plan and elevational views of a tying member utilized in this construction.
Figure 4B:
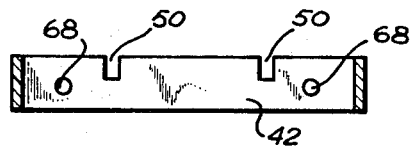

Referring additionally to FIGS. 4A and 4B, there is depicted a tying member 42 which is constructed of aluminum strip, about four feet in length and with a flange 44 on each end for engagement with the wall portion 40 of the channel frame member 30. The manner in which the tying member 42 is secured to the frame member is illustrated in FIG. 3. The flanges 44 are foraminated so that an aperture therein is aligned with a corresponding aperture in the frame wall 40 whereupon a bolt 46 and nut 48 secure the tying member 42 to the frame member 30. In such manner, and referring specifically to FIG. 2, the tying members 42 are disposed on opposite sides of each modular unit 18 and define the outer limits of the modular units.

The top edge of each tying member 42 is notched to provide recesses 50 for receiving therein a longitudinal member 52. Each longitudinal member 52 is of hollow aluminum square tubing, as shown in cross-section in FIG. 3, and serves as a torsion bar for the structure as well as an underpinning for securing the deck surface.

These underpinning members 52 are each eight feet long in this particular construction and are disposed overlapping adjacent modules 18 where appropriate to the configuration, shorter lengths of underpinning members being utilized for the end modular units. Thus, the underpinning members 52 are joined about midway in each modular unit, as indicated at 54 in FIG. 2.

Figure 5:
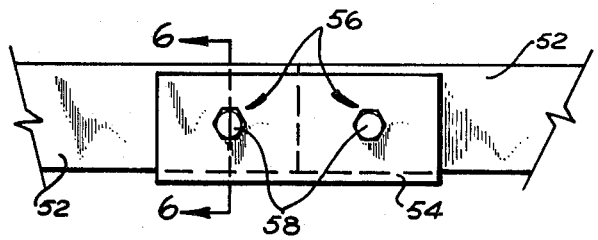
FIG. 5 is a elevational view of the ends of two joined underpinning members.
Figure 6:
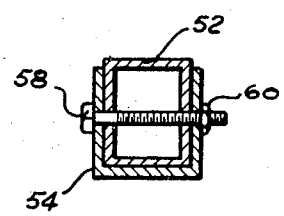
FIG. 6 is a vertical sectional view of the line 6—6 of FIG. 5, in the direction of the arrows.

Referring to FIGS. 5 and 6, there is illustrated the manner of joining tandem underpinning members 52. An aluminum channel member 54 is formed to straddle the joined ends of the underpinnings 52 on the underside thereof, the underpinning ends and channel 54 being foraminated, as at 56 for bolted connection thereat with bolts 58 and nuts 60 to thereby splice the underpinning members 52 together.

Referring back to FIG. 3, the decking 20 is in the form of ⅝ inch plywood with a non-skid surface 62 and is secured to the top of the underpinning members 52 by means of bolts 64 therethrough and nuts 66, or by other securing means as appropriate. By such means, the decking 20 can be lifted from the supporting tying members 42 to make repairs or to maintain the structure, or to perform any particular operation beneath the decking, and then can be readily replaced by merely laying the decking over the tying members in such manner that the underpinning members 52 drop into the tying members recesses 50.

Figure 7:
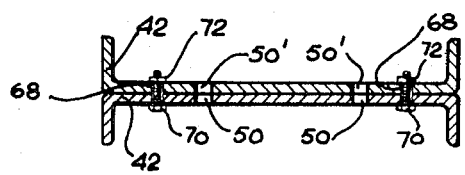
FIG. 7 is a vertical sectional view of two tying members bolted back-to-back.

Referring now to FIG. 7 in conjunction with FIG. 2, a cross sectional view is shown of back-to-back tying members 42 and 42' foraminated as at 68 (see also FIG. 4B) and secured together by means of bolts 70 therethrough and nuts 72. By such means, tandem modular units can be rigidly and solidly interconnected and integrated into a permanent dock structure. In the event that a configuration is chosen whereby the narrow end of a modular unit is to be secured to the wide side of another unit, as at 74 and 76 in FIG. 1, then the region of contacts on the frame member wall 40 thereat is foraminated for bolted connection with the contacting tying member 42. Similarly, in the event that modular units are to be joined along their sides, as at 78 in FIG. 1, then the contiguous channel walls 40 can be foraminated and joined by bolting.

What is claimed is:
1. A floating structure, comprising:
at least one flotation member;
longitudinal frame members extending along the sides of said structure and spaced to define the width of said structure, supported on one or more flotation members;
at least one longitudinal underpinning member extending the length of said structure between and spaced from said frame members;
tying members transverse of said structure secured to and between said frame members, below and supporting said underpinning members; and
decking secured to said underpinning members.

2. The structure of claim 1 wherein a plurality of frame members are tandemly disposed along a plurality of flotation members, and a plurality of underpinning members are tandemly disposed between said frame members.

3. The structure of claim 2 including means interconnecting tandem underpinning members.

4. The structure of claim 1 wherein said tying members are spaced on opposite sides of modular units, and including means for interconnecting adjacent tying members to interconnect said modular units.

5. The structure of claim 4 wherein a plurality of frame members are disposed along a plurality of flotation members and the joins between tandem frame members are spaced longitudinally from the connection between tandem modular members.

6. The structure of claim 1 wherein each frame member is a channel, the bottom flange thereof resting on said flooring and the top flange thereof supporting said decking.

7. The structure of claim 1 wherein each tying member comprises a vertically disposed strip of rigid material foraminated through its vertical extent for bolted interconnection.

8. The structure of claim 1 wherein said frame members are channels having top and bottom edges comprising flanges connecting said decking and flooring respectively, and said tying members are formed with right angle ends connected to said channels between said edges.

9. The structure of claim 1 wherein the top edges of each tying member is formed with notches for receiving said underpinning members.

10. The structure of claim 1 including a channel member formed to straddle joined ends of said underpinnings, said underpinnings and channel member being foraminated for bolted connection thereat.

11. A floating structure, comprising:
at least one flotation member;
longitudinal frame members extending along the sides of said structure and spaced to define the width of said structure, supported on one or more flotation members;
tying members transverse of said structure secured to and between said frame members, each tying member comprising a vertically disposed strip of rigid material foraminated for bolted interconnection;
longitudinal underpinning members extending the length of said structure between said frame members, supported by said tying members, the top edge of each tying member strip being formed with notches for receiving said underpinning members; and
decking secured to said underpinning members.

12. A floating structure, comprising:
at least one flotation member;
longitudinal frame members extending along the sides of said structure and spaced to define the width of said structure, supported on one or more flotation members;
tying members transverse of said structure secured to and between said frame members;
longitudinal underpinning members extending the length of said structure between said frame members, supported by said tying members, each underpinning member comprising a hollow metal tube; and
decking secured to said underpinning members.

13. The structure of claim 11 including a channel member formed to straddle joined ends of said underpinnings, said underpinnings and channel member being foraminated for bolted connection thereat.

References Cited
UNITED STATES PATENTS

| | | | |
|---|---|---|---|
| 3,024,753 | 3/1962 | Benson | 114—0.5 F |
| 3,073,274 | 1/1963 | Lamb | 114—0.5 F UX |
| 3,249,079 | 5/1966 | Moore et al. | 114—0.5 F |

TRYGVE M. BLIX, Primary Examiner